United States Patent [19]

Ridgway et al.

[11] 4,188,247
[45] Feb. 12, 1980

[54] MANUFACTURE OF MAGNETIC TRANSDUCING HEADS

[75] Inventors: Peter C. Ridgway, Staines; Derek F. Case, Sunbury on Thames, both of England

[73] Assignee: Data Recording Instrument Company Limited, Staines, England

[21] Appl. No.: 883,911

[22] Filed: Mar. 6, 1978

[30] Foreign Application Priority Data

Mar. 15, 1977 [GB] United Kingdom ............... 10797/77

[51] Int. Cl.² .................... B32B 31/00; B24B 1/00; G11B 5/42
[52] U.S. Cl. ..................... 156/154; 29/603; 51/310; 51/312; 65/36; 65/43; 65/61; 156/247; 156/344; 360/120; 360/121; 360/126; 428/900
[58] Field of Search ............. 156/154, 280, 247, 344; 427/292; 428/900; 65/36, 61, 43; 51/310–312; 29/603; 360/119, 121, 120, 126

[56] References Cited

U.S. PATENT DOCUMENTS

| | | | |
|---|---|---|---|
| 3,458,926 | 8/1969 | Maissel et al. | 360/120 |
| 3,494,026 | 2/1970 | Sugaya | 29/603 |
| 3,514,851 | 6/1970 | Parkins et al. | 51/310 |
| 3,577,634 | 5/1971 | Secrist | 29/603 |
| 3,579,926 | 5/1971 | Gaspari | 51/312 |
| 3,605,258 | 9/1971 | Fisher et al. | 29/603 |
| 3,807,043 | 4/1974 | Hikino et al. | 29/603 |

FOREIGN PATENT DOCUMENTS

1164754 9/1969 United Kingdom .

Primary Examiner—John T. Goolkasian
Assistant Examiner—J. J. Gallagher
Attorney, Agent, or Firm—Hane, Roberts, Spiecens & Cohen

[57] ABSTRACT

A process for the manufacture of pole structures for magnetic transducing heads is described in which the configuration of the non-magnetic gaps is formed by abrading the ferrite pole structure through a mask to erode recesses in the gap area which have inclined walls. The final dimension of the gap defining face of one of the magnetic elements is determined by removing material from the masked face of the structure until the dimension between the recesses has the desired value.

10 Claims, 4 Drawing Figures

MANUFACTURE OF MAGNETIC TRANSDUCING HEADS

BACKGROUND OF THE INVENTION

This invention relates to the manufacture of magnetic transducing heads.

Magnetic transducing heads commonly have a pair of pole pieces separated by a non-magnetic operating gap. In use a recording medium is moved relative to the head and the gap sweeps out a track on which information is recorded or from which information is reproduced.

It is desirable to manufacture the pole pieces and gap as accurately as possible in order to control the width and position of the track. It has been proposed, in British Patent Specification No. 1,164,754, to use a mask which covers part of the gap and the surrounding material of the pole pieces and exposes another part and the surrounding material. The exposed material is removed by, for example, sand blasting, and the mask is then removed. The parts which it had covered remain and form the pole pieces with the operating gap. The configuration of the head is thus determined by the form of the mask rather than the accuracy with which the constituent pieces of the pole pieces are assembled.

We have, however, discovered that the edge of the mask tends to erode, making the size of the recesses formed by the abrasion rather larger than the corresponding openings in the mask as initially applied to the structure. And in addition it is difficult to make masks of a precisely determined size and shape. Consequently the size of the operating gap will not be precisely that of the corresponding part of the mask as initially formed. These inaccuracies can be significant with, for example, the small heads and high track packing densities currently used in digital recording.

SUMMARY OF THE INVENTION

This invention provides a process for the manufacture of a pole structure for a magnetic transducing head, the process comprising: providing a structure comprising a pair of members of magnetic material having gap defining faces separated by a gap filled with non-magnetic material and having a surface including said non-magnetic gap; masking said surface by masking means extending in abutting relationship with said surface, said masking means being so shaped and positioned as to mask a first region of the structure including a first part of the non-magnetic gap and to expose a second region of the structure including a second part of the non-magnetic gap neighbouring the masked first part of the gap; directing a stream of abrasive particles at the exposed second region of the structure to produce a recess in the structure having its wall so inclined as to provide, at the gap defining face on at least one of the members, an edge intersecting said surface and inclined thereto at an angle less than 90°; and thereafter removing the masking means and then removing material from the previously masked first region of the surface of the structure to produce a new surface having an intersection with said inclined edge at a desired position on the pole structure.

Thus, the final size of the masked part of the gap is controlled by the removal step, which allows variations in the size of the recesses after the abrasion step to be compensated for.

Preferably there are two exposed regions each including a part of the gap, these two parts of the gap being separated by the masked part of the gap, a recess being produced at each of the exposed regions, and each having its wall so inclined as to produce, on at least one of the side members, two edges inclined to one another with the masked part of the gap extending therebetween.

There may be more than one non-magnetic gap in the original structure, each being treated by the process according to the invention. The head may thus be provided with one or more erase gaps, or with separate recording and reproducing gaps. The method of the invention allows them to be accurately disposed with respect to one another.

Preferably the said two edges are inclined to one another, in the region of the gap at an included angle in the range 20 to 50 degrees.

The removal of material from the part of the structure may be carried out in two stages, a first stage in which material is removed until the distance along the gap between the said two side walls reaches a predetermined value, and a second stage in which a predetermined depth of material is removed.

The invention also provides a pole structure manufactured by the method of the invention, and a magnetic transducing head including a pole structure of the invention, the said gap forming a magnetic operating gap of the head.

BRIEF DESCRIPTION OF THE DRAWINGS

A method of making a pole structure and magnetic transducing head in accordance with the invention will now be described in greater detail by way of example with reference to the accompanying drawings, in which.

DESCRIPTION OF THE PREFERRED EMBODIMENT

Figure 1:
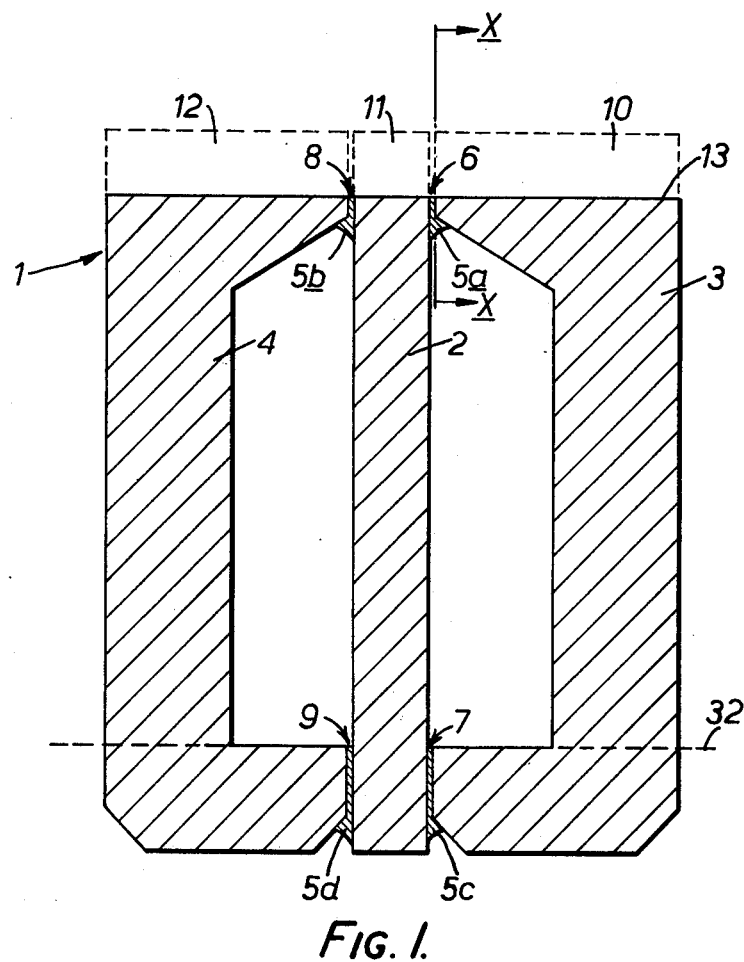
FIG. 1 is a section through the structure from which the pole structure is manufactured.

Referring to FIG. 1, the head is manufactured from a structure 1 made up of a ferrite I-bar 2 and ferrite C-bars 3 and 4. The bars have their longest dimension extending perpendicular to the plane of the paper, as seen in FIG. 1, and during a later stage of the processing are sliced in spaced parallel planes parallel to the plane of the paper to yield a number of separate head cores.

The bars 2, 3 and 4 are bonded together in a gap glassing step, by glassing at each end of each C-bar 3 and 4, as shown at 5a to 5d. The C-bar is separated from the I-bar 2 by a gap 6 at the front and a gap 7 at the rear of the bar 3 (the terms "front" and "back" are used in this description to refer to parts which are respectively nearer or further from the part of the head which in use faces the recording medium). The C-bar 4 is separated from the I-bar 2 by a gap 8 at the front and a gap 9 at the rear of the bar 4.

In a completed head the gap 6 forms the read-write gap and the gap 8 forms a pair of erase gaps which, when the head is recording, erase a track on each side of the written track. This ensures that any earlier recorded information is removed and not detected during a subsequent read operation if the head is slightly displaced from the writing position. The gap 6 will be called the read-write gap and the gap 8 the erase gap after their eventual functions.

The structure 1 may be assembled from its constituent parts by the following method. The bars 2, 3 and 4 are originally made to extend to include parts 10, 11 and 12, as shown in FIG. 1 by the dotted lines. Metallic spacers, for example of gold, are deposited on the faces of the C-bars 3 and 4 that will form walls of the gaps at positions on the C-bars which will be discarded in a subsequent operation in which the assembled structure is sliced into individual cores.

The bars 2, 3 and 4 are clamped together, their separation at the gaps 6 to 9 being determined by the thickness of the spacers. In the gap glassing, a slurry paste of glass is applied to the regions 5a to d, the paste is allowed to dry, and the assembly is heated until the glass softens and flows to fill the gaps 6 to 9 around the spacers by capilliary action. The assembly is then cooled in a controlled manner and released. It is now bonded by the glass.

For a reason which will be explained, the glass in the gaps is chosen to have a relatively high softening temperature.

The distance from the front to the rear of the erase gap 8 is made slightly larger (as a result of the initial shaping of the C-bars 3 and 4) than the corresponding dimension of the read-write gap 6.

Figure 2:
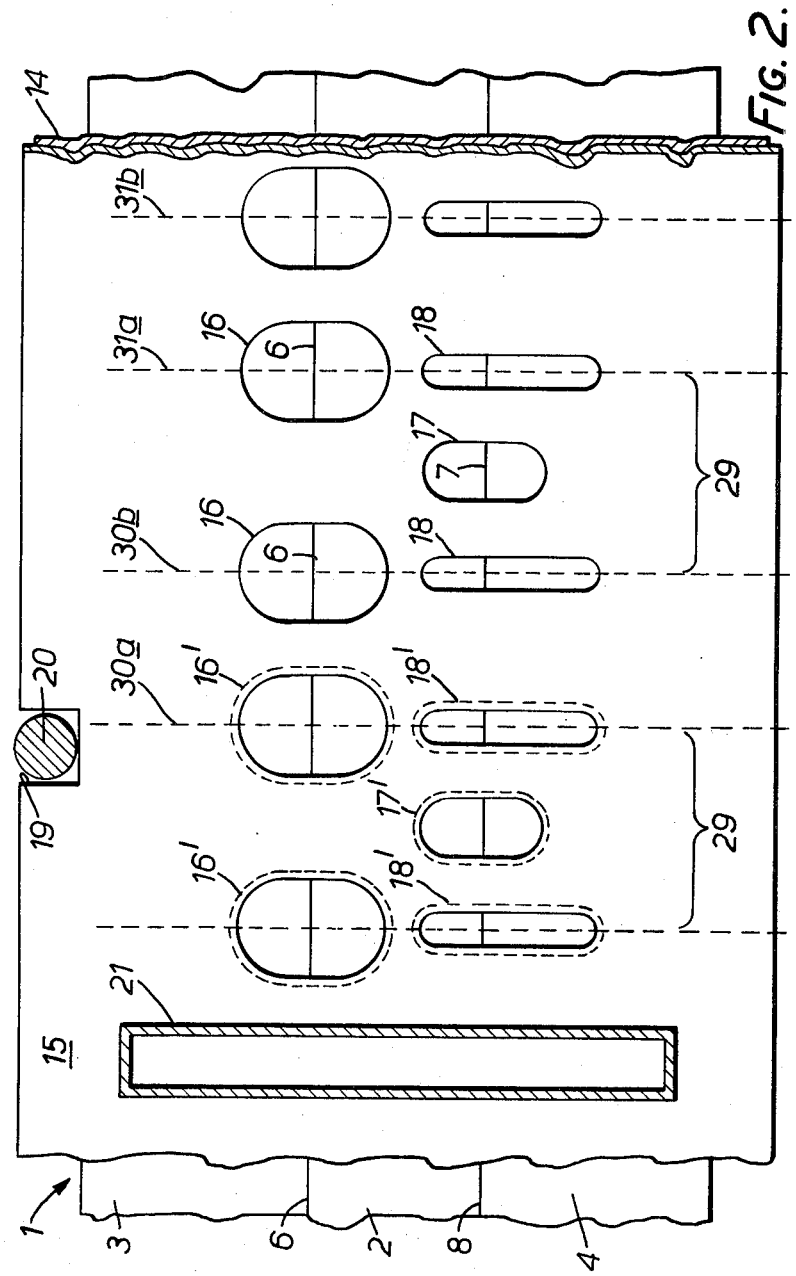
FIG. 2 is a view, partly cut away, of the structure and mask.

Referring to FIG. 2, after the structure 1 has been assembled its front face 13 is polished and a mask 15 is applied to it. The mask 15 has a series of groups of five holes, each group corresponding to a separate head. In each group there are two holes 16 over the read-write gap 6 and three holes over the erase gap 8, a central hole 17 and two side holes 18. To locate the mask correctly it is provided with notches 19 (of which only one is shown) accurately positioned with respect to the holes 16 to 18. The structure 1 is positioned on a jig with the side of the read-write C-bar 3 resting against pins 20 which project from the jig. The notches 19 are also positioned against the pins 20, so that they are aligned with the side of the C-bar 3, which serves as a datum. The holes 16 to 18 are thus correctly positioned with respect to the gaps 6 and 8.

As an example of a suitable material the mask may be made of stainless steel. The holes and notches are formed by photo-etching, but could alternatively be formed for example by punching.

Before being applied to the structure the mask 15 is coated with a thin layer 14 of adhesive. After the mask has been applied to the structure the assembly is cured to bond the mask 15 to the structure 1. It is important for the subsequent abrasion process that the mask should lie in abutting relationship with the surface of the ferrite structure and that there should be good adhesion between the ferrite and the material of the mask in those areas overlying the non-magnetic gaps such as those between the holes 17 and 18. There should also be no significant amount of adhesive in the holes 16, 17 and 18.

The structure 1 with its mask 15 is then subjected to an abrasion process. It is placed in an air abrasion machine having a slot-like nozzle 21 positioned with its long dimension transverse to the gaps 6 and 8, and spanning the holes 16 to 18. The nozzle 21 is caused to oscillate along the length of the structure 1, parallel to the gaps 6 and 8. As it does so it ejects a fan-shaped stream of abrasive particles which remove material of the structure 1 from the holes 16 to 18 to form recesses 22 to 24 (see the left-hand group in FIG. 2).

The abrasion process also erodes the mask 15 at the edges of the holes. The holes therefore increase in size so that they have the final contours 16' to 18' as shown dotted in the left-hand group of FIG. 2. The bridges between the holes that mask parts of the transducing gaps 6 and 8 are correspondingly reduced.

The abrasion process is continued until the distances between the holes, taken along the transducing gaps, as determined for example by optical examination, fall within relatively broad limits. It is an advantage that the subsequent steps of the invention allow this distance to be controlled more precisely, because it is difficult to achieve high accuracy at this stage, because of variations in the mask and the difficulty of determining the precise position of the edge of the gap without polishing to remove the particulate structure of the abraided surface.

Figure 3:
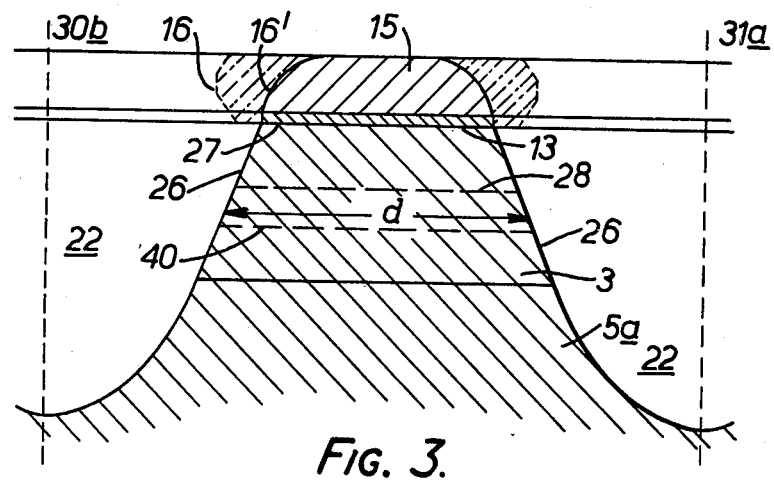
FIG. 3 is a section through the structure after abrasion and taken on the line X—X of FIG. 1.

FIG. 3 is a section, taken after abrasion, through the mask 15 and structure 1 along the face of the C-bar 3 which bounds the read-write gap 6 (the line X—X of FIG. 1). The walls of the recesses 22 to 24 formed during abrasion are inclined to the normal. Therefore, to take the case of the recesses 22 shown in FIG. 3, their walls on either side of the part of the C-bar 3 in the region of the gap 6 are inclined to one another so that the face of the C-bar 3 bounding the gap 6 has inclined edges 26 and tapers towards the front edge 27 of the gap. The abrading machine is adjusted to give the desired angle for the edges 26 (the criteria for the angle are discussed below). The adjustment may be achieved by varying the velocity of the nozzle along the workpiece or the distance between the nozzle 21 and the work piece.

After the abrasion process the mask 15 is stripped off the structure 1 and the front face 13 cleaned. It is then glassed in a first glassing step. The glass is applied as a slurry paste, care being taken to fill the recesses 22 to 24 well. The paste is allowed to dry and the structure subjected to a heat-treatment cycle. The temperature is raised to cause the glass to soften and flow, and the temperature is maintained at a high value for long enough for the bubbles which tend to form in small ferrite pockets to escape. The temperature is then lowered.

The glass is chosen to soften at a sufficiently low temperature for the glass to be able to reach a low enough viscosity for the bubbles to escape at a temperature below that at which the glass in the gaps softens and puts the accurate dimensions of gaps at risk. The glass applied to the face 13 must also form a good bond with the ferrite and match its expansion characteristics. It must be hard enough to protect the edges of the ferrite during subsequent machining, but will generally not be hard enough to provide good wear characteristics when the head is in use.

Suitable glasses can for example be chosen from the zince borate family.

The glassed front face 13 is now machined or lapped to remove first the surplus glass and secondly part of the material of the head. This stage is carried on until the distance between the inclined edges 26 is increased from the length of the edge 27 to a desired value, as measured for example by a travelling microscope, achieved when the front edge of the gap reaches a position 28.

The structure 1 is now sliced into individual pole structures 29 by machining away the material between the individual groups of holes with a sawing wheel, the material being removed between pairs of lines such as the lines 30a and 30b and 31a and 31b of FIGS. 2 and 3. If the groups of holes are spaced from one another by a constant amount it is found that once the correct position for the first cut has been established the remaining cuts may be made simply by advancing the workpiece with respect to the wheel by the pitching distance. The cut sides of the individual pole structures 29 are lapped and polished and the material at the rear of the structure 29 removed back to a rear face 32 as shown in FIG. 1.

Side cheeks 34 and 35 are now attached to each pole structure 29 to strengthen it and protect the edges. The side cheeks 34 and 35 and the pole structure 29 are clamped in a location jig and tacked temporarily by a heat resistant cement applied round the edges of the side cheek. The side cheeks 34 and 35 are non-magnetic and may for example be barium titanate ceramic. They and the cement are chosen to match the expansion characteristics of the ferrite.

The side cheeks 34 and 35 are then bonded permanently by a second glassing step. The glass is a mixture of the glass used in the first glassing step (in which the recesses were filled with glass) and a second glass of a higher softening temperature. The softening point of the mixture is chosen to be between that of the glass of the first glassing and that of the gap glass (it will therefore be seen why the gap glass is chosen to have a relatively high softening point). The second glass is hard and provides good wear characteristics, it may for example be selected from the lead silicate family, whereas the first glass is relatively soft and does not provide good wear characteristics.

The glassing mixture is applied as a thin slurry paste on the front face 13 of the pole structure 29 and adjacent front faces of the side cheek. The paste is allowed to dry and then the temperature raised to the higher softening temperature of the second glass to cause the glass to soften and flow. The first glass in the recesses 22 to 24 flows at a lower temperature. At this higher temperature the first glass has a lower viscosity than the second glass and the mixture diffuses into it and partially replaces it in the recesses, but without the bubbles at the interface with the ferrite that would be liable to exist if the mixture were introduced into the recesses initially.

The assembly is allowed to cool in a controlled fashion. The second glassing provides protection for the side walls of the recesses and the ends of the gap when the head is in use.

Figure 4:
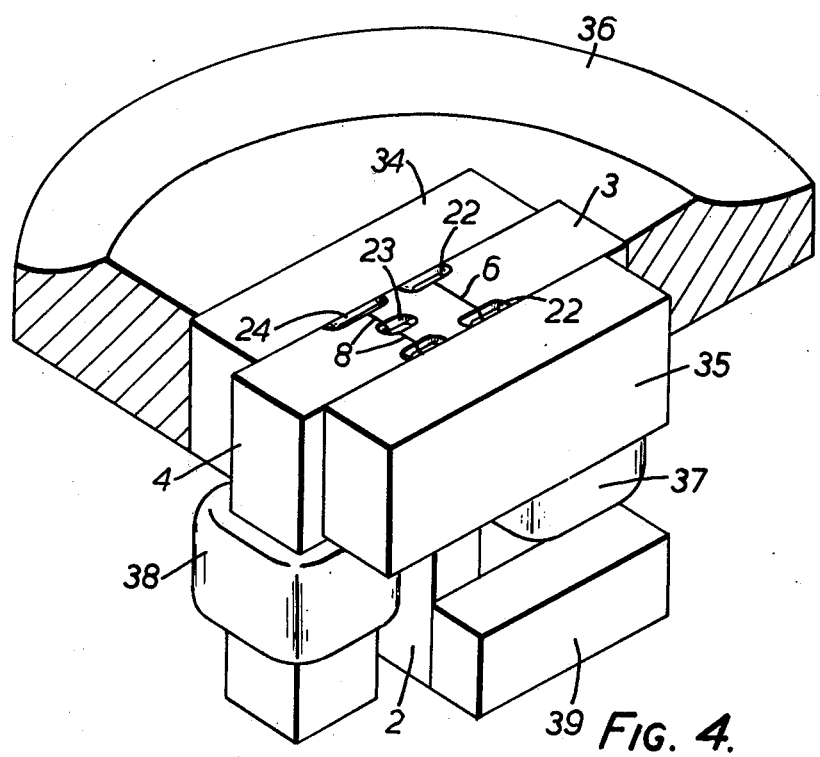
FIG. 4 is a diagramatic perspective view, partly cut away, of the assembled head.

The assembly is now inserted in a plastic housing 36 and held in place with epoxy resin. To complete the head a read-write coil 37 and an erase coil 38 are slipped over the appropriate limbs 3 and 4 and attached to terminals in the housing (not shown). A keeper bar 39 is then bonded with epoxy resin to the central limb 2 and read-write limb 3 to complete the magnetic circuit, and another keep (not visible in FIG. 4) joins the far side of the central limb to the erase limb 4.

Finally, the front face 13 of the pole structure and the surrounding face of the keepers 34 and 35 and housing 36 are spherically ground, lapped and polished to provide the final working surface of the head. During this stage a predetermined depth of material is removed to bring the front surface of the head back to a line 40 as shown in FIG. 3. It is found that the inclination of the side walls 26 can be made sufficiently accurate for the change in distance between the side walls 26 from the line 28 (where the distance is assured by measurement) to the line 40 to be a predetermined amount within the required accuracy. This distance d along the line 40 is the track width of the head.

The angle of inclination of the side walls is selected in conjunction with the changes expected in the dimensions of the gap during processing so that when the desired track width d is achieved the dimension from the front to rear of the gap (the line 40 to the glass 5c) has a desired value.

The following are details of a specific head which has proved satisfactory. The read-write gap 6 is about 0.00008 inches and the erase gap about 0.0001 inches. They are separated by 0.027 inches. The original dimension from the front face 13 to the back of the read-write gap is about 0.005 inches, with the same dimension for the erase head being 0.001 to 0.004 inches larger. The length of the ferrite structure, i.e. in a direction parallel with the gaps 6 and 7 may be of the order of one inch.

The mask is produced by photo-etching and the distance between the holes 16 of the mask is originally between about 0.011 and 0.0115 inches (photo-etching tends to produce slight variations from one mask to the next. The abrasion nozzle is shaped to give a fan tail emission and has an aperture $0.007 \times 0.125$ inches. The abrading material is alumina powder of 9/um particle size, and the flow rate of the powder typically 10 to 15 grams/minute at an airline pressure of 100 pounds per square inch. The nozzle is traversed back and forth at a uniform rate of 3 to 4 inches a second over the structure and to ensure that all parts of the structure are subjected to the same degree of abrading, the traverse of the nozzle extends beyond the structure so that during any non-uniform movement in reversal of the movement of the nozzle the structure is not abraded by particles issuing from the nozzle. The spacing of the nozzle from the surface of the mask is set in the range 0.030 to 0.080 inches.

It is found that the inclination of each side wall 26 to the normal to the pole face 13 (in its original flat form), with the above mentioned flow rate of powder and arrangement of nozzle, is about 21 degrees, giving an inclination of 42 degrees between the two side walls on either side of the gap, which is of course preserved when the final spherical surface is put on the pole face 13. Variations of the nozzle distance within the range given tend to alter the rate of removal of material rather than the angle, but the angle can change sharply if the distance is brought outside this range.

During the first removal material is removed until the distance along the line 28 is about 0.0094 inches, at a depth of about 0.002 inches below the original surface. During the final removal another 0.001 inches is removed to give a track width d of 0.0104 inches.

The gap glass may soften at about 800° C. The glass used in the first glassing may be a Corning 7570 or 1417. In the first glassing the temperature may be raised to 600° C. at a rate of 40° C. per minute, held for 15 to 20 minutes and lowered at a rate not exceeding 15° C. per minute. The glass used in the second glassing may be a 50:50 (by weight) mixture of the first glass and a Ramsden RE2852 or a Corning 8875, 9013 or 8161. The glassing is carried out by raising the assembly to 700° C. at a rate of not more than 30° C. per minute, maintaining the temperature for 20 minutes and lowering it at a rate not exceeding 10° C. per minute. To enhance the outgassing in the high temperature stage the pressure may be reduced to 100 Torr and then released to atmospheric several times.

Various modifications may be made. The final track width may be achieved by a single removal stage after the abrasion, with no significant material being removed from the pole structure when the spherical shape is given to the final assembled housing and head. Alternatively, the track distance along the read-write gap may be measured at this stage and grinding continued until the desired track width is achieved. This is particularly useful if, though the holes of any one group are consistent in size, there is a gradual variation from one group to the next (as is possible with photo-etching techniques) because it allows the track width of individual heads to be controlled.

The glass used in the second glassing need not include the first glass provided it mixes satisfactorily with the first glass during the glassing.

The recesses need not extend into the glass menisci at the rear of the gaps, although this may reduce the performance of the read-write gap in particular. Instead of a spherical housing the side cheeks may be of unequal proportions and a central air-relief groove machined to form a catamaran-type slider.

We claim:

1. A process for the manufacture of a pole structure for a magnetic transducing head, the process comprising:

providing a structure comprising first and second magnetic members, each member including a planar gap defining face and said members being located relative to one another with the gap defining faces in opposed relationship and separated by a non-magnetic gap filled with non-magnetic material, and said structure including an initial surface extending over both of said magnetic members and across the non-magnetic material in the gap between said members;

applying masking means to said initial surface to mask a first region of said initial surface leaving exposed a second region of said initial surface, said second region extending over a part of said first magnetic member and including an intersection with a part of the gap defining face of said first magnetic member:

directing a stream of abrasive particles toward said initial surface to produce at the exposed second region a recess including a side wall so inclined that an edge along an intersection between the side wall and the gap defining face of said first member intersects the initial surface at an initial location in said surface and at an angle to a direction perpendicular to said surface;

removing the masking means from said first region;

thereafter removing material substantially uniformly from said initial surface to produce a new surface so that due to said inclination of said edge the new surface has an intersection with said edge at a new location displaced from said initial location in a direction aligned with the surface; and continuing to remove material until the new location is located at a desired position in the new surface of the structure.

2. A process as claimed in claim 1 in which the masking means is so applied that the exposed second region is positioned on the initial surface to produce a recess of which the inclined side wall thereof intersects with the gap defining face of the first magnetic member along two edges inclined to one another; and material is removed from the initial surface until intersections of said edges with the new surface are spaced apart by a desired distance.

3. A process as claimed in claim 1 in which the masking means is so applied to that two second regions are exposed and two recesses are produced in the structure, the side walls of the recesses being so inclined that the edge along the intersection between the side walls of one of said recesses is inclined relative to the edge along the intersection between the side wall of the other of said recesses; and material is removed from the initial surface until intersections of said edges with the new surface are spaced apart by a desired distance.

4. A process as claimed in claim 1 in which the abrasive particles are carried in a stream of air issuing from a nozzle and in which relative movement is produced between the structure and the nozzle to cause the stream of particles to traverse the surface of the structure.

5. A process as claimed in claim 4 in which the nozzle is traversed across the structure at a uniform velocity.

6. A process as claimed in claim 5 in which the nozzle has an outlet aperture having a dimension in the direction of traverse smaller than its dimension transverse to said direction of traverse.

7. A process as claimed in claim 6 in which the aperture of the nozzle is rectangular.

8. A process as claimed in claim 1 in which the members are of ferrite bonded together at the non-magnetic gap by a first glass having a first softening temperature; and in which the recess is filled with a second glass having a second softening temperature lower than said first temperature prior to removing the material from the previously masked first region of the structure.

9. A process as claimed in claim 8 in which after filling the recess with the second glass, a third glass having a softening temperature intermediate the first and second temperature is placed adjacent the recess and the structure is heated to cause the second and third glasses to soften so that the third glass flows into the recess to replace some of the second glass therein.

10. A process as claimed in claim 9 in which the third glass is placed adjacent the recess as a constituent of a mixture of said third and second glasses.

* * * * *